United States Patent [19]  [11] 4,026,858
Andrews et al.  [45] May 31, 1977

[54] CURABLE EPOXIDE RESIN COMPOSITIONS

[75] Inventors: Christopher Michael Andrews; Bryan Dobinson, both of Cambridge, England

[73] Assignee: Ciba-Geigy Corporation, Ardsley, N.Y.

[22] Filed: Oct. 28, 1975

[21] Appl. No.: 626,595

[30] Foreign Application Priority Data

Nov. 7, 1974   United Kingdom ............ 48247/74

[52] U.S. Cl. .......................... 260/30.2; 260/2 EC; 260/2 N; 260/30.4 EP; 260/32.8 EP; 260/33.2 EP; 260/33.4 EP; 260/47 EC; 260/47 EN; 260/55; 260/59 EP; 260/63 R; 260/78.3 R; 260/78.41; 260/79.3 R

[51] Int. Cl.² ........................................ C08G 59/56

[58] Field of Search .......... 260/47 EC, 47 N, 2 EC, 260/2 N, 78.41, 78.3 R, 30.2, 30.4 EP, 32.8 EP, 33.2 EP, 33.4 EP, 63 R, 79.3 R

[56] References Cited

UNITED STATES PATENTS

| | | | |
|---|---|---|---|
| 3,018,262 | 1/1962 | Shroeder | 260/29.2 |
| 3,171,764 | 3/1965 | Parker | 149/19 |
| 3,506,598 | 4/1970 | Groff et al. | 260/2 |

*Primary Examiner*—Howard E. Schain
*Assistant Examiner*—Earl A. Nielsen
*Attorney, Agent, or Firm*—Vincent J. Cavalieri

[57] ABSTRACT

To accelerate the curing of an epoxide resin by means of an aromatic or cycloaliphatic polyamine there is incorporated magnesium, calcium, zinc, manganese, cobalt, or nickel perchlorate. Typically, from 0.2 to 2 parts by weight of the perchlorate is used per 100 parts of the combined weights of the epoxide resin and the polyamine.

10 Claims, No Drawings

CURABLE EPOXIDE RESIN COMPOSITIONS

This invention relates to curable epoxide resin compositions and to the products obtained by curing such compositions.

It is known that epoxide resins, i.e., substances containing on average more than one 1,2-epoxide group per molecule, may be cured by reaction with various classes of substances to form cross-linked, infusible, insoluble products having valuable technical properties. One class of curing agents commonly employed comprises aromatic and cycloaliphatic polyamines. Although these amines are useful curing agents, being employed chiefly to cure epoxide resins at room temperature or moderately elevated temperatures, they suffer from the defect that they cure epoxide resins only slowly.

There is therefore a demand for an accelerator, that is to say, a substance which enhances the rate of cure. While numerous types of compound have been employed for this purpose, the accelerating effect they impart, however, is relatively modest.

We have now found that magnesium, calcium, zinc, manganese, cobalt, and nickel perchlorates very markedly accelerate the cure of an epoxide resin by aromatic or cycloaliphatic polyamines.

U.S. Pat. No. 2,829,072 discloses the use of the perchlorates of magnesium, aluminium, cadmium, copper, manganese, zinc, silver, lead, and cobalt to cure epoxide resins on textile materials at high temperatures, typically 163° c to 191° C. U.S. Pat. No. 2,886,472 discloses a similar process in which a wide range of metal salts is used as the heat-curing agent, specific examples being zinc fluoborate, zinc sulphate, magnesium fluoborate, magnesium perchlorate, potassium persulphate, copper fluoborate, copper persulphate, cobaltic fluoborate, chromic nitrate, magnesium nitrate, and calcium phosphite. U.S. Pat. No. 3,028,271 concerns solid rocket propellants, comprising a particulate inorganic perchlorate as oxidant, bound with a reaction product of a polyglycidyl ether and a polyamide: usually, the weight of the perchlorate is several times that of the combined weights of the polyglycidyl ether and the polyamide. U.S. Pat. No. 3,454,436 also relates to rocket propellant compositions containing, specifically, lithium perchlorate, and discloses that this perchlorate accelerates the cure of epoxide resins with polyamines, the only amines, however, which are exemplified being aliphatic.

It was not to be expected from these disclosures that certain perchlorates would have the property of accelerating so markedly the cure of an epoxide resin by means of an aromatic or cycloaliphatic polyamine, even when comprising only a few percent by weight of the combined amount of the epoxide resin and the polyamine, unpublished experiments by the inventors having shown that numerous salts of perchloric acid, including those with aluminium, barium, copper, iron$^{II}$, iron$^{III}$, chromium$^{III}$, zirconium, vanadium (VO$^{II}$), potassium, and sodium, had little effect as accelerators for curing epoxide resins by aromatic or cycloaliphatic polyamines while lithium perchlorate had only a moderate accelerating effect on aromatic polyamines.

One aspect of this invention therefore comprises curable compositions comprising a. an epoxide resin, b. as curing agent therefor, an aromatic or cycloaliphatic polyamine (as hereinafter defined), and c. magnesium, calcium, zinc, manganese, cobalt, or nickel perchlorates. Another aspect of this invention comprises a process for curing an epoxide resin which consists of forming a mixture of the epoxide resin, a curing amount of an aromatic or cycloaliphatic polyamine, and magnesium, calcium, zinc, manganese, cobalt, or nickel perchlorate as accelerator, and allowing or causing the mixture to cure.

Epoxide resins which may be employed in these compositions are in general those containing terminal groups of formula

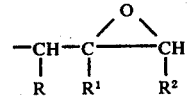

directly attached to atoms of oxygen, nitrogen, or sulphur, where either R and R$^2$ each represent a hydrogen atom, in which case R$^1$ denotes a hydrogen atom or a methyl group, or R and R$^2$ together represent —CH$_2$CH$_2$—, in which case R$^1$ denotes a hydrogen atom.

As examples of such resins may be mentioned polyglycidyl and poly(β-methylglycidyl) esters obtainable by reaction of a compound containing two or more carboxylic acid groups per molecule with epichlorohydrin, glycerol dichlorohydrin, or β-methylepichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly(β-methylglycidyl) ethers obtainable by reaction of a compound containing at least two free alcoholic hydroxyl and/or phenolic hydroxyl groups per molecule with the appropriate epichlorohydrin or glycerol dichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol, and poly(epichlorohydrin); from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)-diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl) sulphone, 1,1,2,2-tetrakis(4-hydroxyphenyl)ethane, 2,2-bis(4-hydroxyphenyl)-propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butylphenol. Poly(N-glycidyl) compounds include, for example, those obtained by dehydrochlorination of the reaction products of epichlorohydrin with amines containing at least two aminohydrogen atoms such as aniline, n-butylamine, bis(4-aminophenyl)methane, and bis(4-methylaminophenyl)-methane; triglycidyl isocyanurate; and N,N'-diglycidyl derivatives of cyclic alkylene ureas, such as ethylenurea and 1,3-propylenurea, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl) ether.

Examples of epoxide resins having groups of formula I where R and $R^2$ conjointly denote a —$CH_2CH_2$— group are bis(2,3-epoxycyclopentyl) ether and 2,3-epoxycyclopentyl glycidyl ether.

Epoxide resins having the 1,2-epoxide groups attached to different kinds of hereto atoms may be employed, e.g., the N,N,O- triglycidyl derivative of 4-aminophenol, glycidyl ether-glycidyl esters of salicylic acid and phenolphthalein, N-glycidyl-N'-(2-glycidyloxypropyl)-5,5-dimethylhydantoin, and 2-glycidyloxy-1,3-bis-(5,5-dimethyl-1-glycidylhydantoin-3-yl)propane.

If desired, a mixture of epoxide resins may be used. Preferred epoxide resins are polyglycidyl ethers, polyglycidyl esters, and N,N'-diglycidylhydantoins. Specific preferred resins are polyglycidyl ethers of 2,2-bis(4-hydroxyphenyl)propane, of bis(4-hydroxyphenyl)methane, or of a novolak formed from formaldehyde and phenol, or phenol substituted in the ring by one chlorine atom or by one alkyl hydrocarbon group containing from one to nine carbon atoms. and having a 1,2-epoxide content of more than 0.5 equivalent per kilogram.

By "aromatic polyamine" and "cycloaliphatic polyamine" we mean a compound having at least three hydrogen atoms per molecule attached to amino nitrogen, at least two of which hydrogen atoms are attached to, respectively, aromatic amino nitrogen and cycloaliphatic amino nitrogen.

Desirably the polyamine contains no group or atom, other than the aforesaid amino hydrogen atoms, capable of reaction with the epoxide resin under the curing conditions employed.

Aromatic polyamines which are suitable as the curing agent (b) include bis(4-aminophenyl)methane, bis(4-aminophenyl) sulphone, bis(4-aminophenyl) ketone, bis(4-aminophenyl) ether, o-, m-, and p-phenylenediamine, and bis(4-amino-3-ethylphenyl)methane.

Suitable cycloaliphatic polyamines include bis(4-aminocyclohexyl)-methane and its 3,3'-dimethyl derivative, 2,2-bis(4-aminocyclohexyl)-propane, and 3-aminomethyl-3,5,5-trimethylcyclohexylamine.

The proportion of curing agent to be used will depend on such factors as the epoxide content of the epoxide resin used, the nature of the curing agent, the curing conditions which may be employed, and the properties sought in the cured product. The proportion required may readily be determined by routine experimentation but usually from about 0.8 to 1.2 amino-hydrogen equivalents of the curing agent are used per 1,2-epoxide equivalent of the epoxide resin.

The amount of the accelerator, too, may vary according to such factors as those just mentioned, but usually from 0.2 to 2 parts by weight are employed per 100 parts of the combined weights of the epoxide resin (a) and the curing agent (b).

The accelerator is best incorporated dissolved in an inert organic solvent such as 2-methoxyethanol, ethylene glycol, diethylene glycol, N-methylpyrrolidone, γ-butyrolactone, and ethyl methyl ketone. While small amounts of water, such as that present as water of crystallisation, may be tolerated, larger amounts should be avoided because they may inhibit the accelerating action. Thus, in Example 5 of the following Examples it is g - batch that the gel time of a 66 g-batch of an epoxide resin composition (normally over 45 hours) is reduced to only 8 minutes if 0.5 g of a 50% solution of magnesium perchlorate in 2-methoxyethanol be added: if the same amount of a 50% aqueous solution be added, the gel time, although still strikingly reduced, is over 11 times longer than if water were absent, viz., 89 minutes.

The new compositions may further contain suitable plasticizers such as dibutyl phthalate, dioctyl phthalate, and tricresyl phosphate, inert diluents such as tars and bitumen and so-called reactive diluents, especially monoepoxides such as n-butyl glycidyl ether, iso-octyl glycidyl ether, phenyl glycidyl ether, cresyl glycidyl ethers, glycidyl esters of tertiary, aliphatic, monocarboxylic acids, glycidyl acrylate, and glycidyl methacrylate. They may also contain additives such as fillers, reinforcing materials, colouring matter, flow control agents, flame inhibitors, and mould lubricants. Suitable extenders, fillers, and reinforcing materials are, for example, glass fibres, carbon fibres, ballotini, mica, quartz flour, calcium carbonate, cellulose, kaolin, wollastonite, colloidal silica having a large specifid surface area, powdered poly(vinyl chloride), and powdered polyolefin hydrocarbons such as polyethylene and polypropylene.

The curable compositions of this invention may be used as laminating resins, paints and lacquers, sinter powders, impregnating and casting resins, moulding compositions, putties and sealing compounds, potting and insulating compounds for the electrical industry, and adhesives, and also in the manufacture of such products.

They may be supplied as a two-part pack, one part containing the epoxide resin and the other the polyamine curing agent, the perchlorate being in either or both parts, but advantageously only in the polyamine part, because some epoxide resins tend to polymerise slowly, over a period of some months, when kept in contact with the perchlorate at room temperature.

The following Examples illustrate the invention. Temperatures are in degrees Celsius and, unless otherwise specified, parts are by weight. The accelerating effect is shown, as is conventional in this art, by the reduction in the time taken for the composition to gel, prior to curing; gelatin times were determined at room temperature by means of a "Techne" gelation timer.

"Epoxide resin I" denotes a polyglycidyl ether of 2,2-bis(4-hydroxyphenyl)propane having a 1,2-epoxide content of 5.16 equivalents per kilogram and a viscosity at 21° of 245 poises.

"Epoxide resin II" denotes diglycidyl tetrahydrophthalate; its 1,2-epoxide content was 6.0 equiv./kg.

"Epoxide resin III" denotes the tetrakis(N-glycidyl) derivative of bis(4-aminophenyl)methane.

"Epoxide resin IV" denotes N,N'-diglycidyl-5,5-dimethylhydantoin.

"Epoxide resin V" denotes N-glycidyl-N'-(2-glycidyloxypropyl)-5,5-dimethylhydantoin.

"Epoxide resin VI" denotes the tetraglycidyl ether of pentaerythritol, advanced with 2,2-bis(4-hydroxyphenyl)propane to an epoxide content of 8.5 equiv./kg.

"Epoxide resin VII" denotes the diglycidyl ether of butane-1,4-diol.

"Harder I" denotes bis(4-aminophenyl)methane.

"Hardener II" denotes bis(4-amino-3-methylcyclohexyl)methane.

"Hardener III" denotes a eutectic mixture of bis(4-aminophenyl)methane, 3-ethyl-4,4'-diaminodiphenylmethane, and bis(3-ethyl-4-aminophenyl)methane.

Unless indicated to the contrary, the perchlorates employed were anhydrous.

EXAMPLE 1

Epoxide resin I (50 g) was mixed at room temperature with 13.5 g of Hardener I and 11.5 g of γ-butyrolactone. The gel time at room temperature was 3557 minutes.

When 0.5 g of a conventional accelerator, 2-methoxyethyl maleate, was incorporated into similar mixture, the gel time at room temperature was 644 minutes.

When the conventional accelerator was replaced by 0.25 g or 0.5 g of magnesium perchlorate, or by 0.5 g of calcium perchlorate tetrahydrate, the gel time at room temperature was 24 minutes, 10 minutes, and 26 minutes, respectively.

EXAMPLE 2

Epoxide resin I (50 g) was mixed at room temperature with 13.5 g of Hardener I, 11.5 g of γ-butyrolactone, and 0.5 g of a 50% solution of magnesium perchlorate in 2-methoxyethanol. The gel time at room temperature was 12 minutes.

When the magnesium perchlorate solution was replaced by 0.5 g of a 50% solution of lithium perchlorate in 2-methoxyethanol the gel time was over one hundred times longer, viz. 1251 minutes, showing that the accelerating effect is dependent upon the whole molecule of the salt, and not just upon the anion.

EXAMPLE 3

A 50% solution (0.5 g) of magnesium perchlorate in 2-methoxyethanol was incorporated in a mixture containing 50 g of Epoxide resin I and 7.5 g of Hardener II. The gel time of the resultant mixture was 45 minutes: when the magnesium perchlorate solution was omitted, the gel time was 460 minutes.

EXAMPLE 4

A mixture of Epoxide resin I (46.6 g), 12.8 g of Hardener I, 10 g of dibutyl phthalate, and 0.8 g of phenyl glycidyl ether gelled in 887 minutes: a similar mixture containing 0.5 g of a 50% solution of magnesium perchlorate in 2-methoxyethanol gelled after only 21 minutes.

EXAMPLE 5

In this Example the efficacy of magnesium perchlorate as an accelerator is compared with that of other magnesium salts and other perchlorates.

Mixtures, each of 50 g of Epoxide resin I and 16 g of Hardener III, were prepared and to each (except the control) was added a solution of a salt in 2-methoxyethanol. The gelatin times were determined, and are shown in Table I.

TABLE I

| Accelerator | Gel time (minutes) |
|---|---|
| none | 2682 |
| 0.5 g of 50% solution of MgI$_2$ | 2249 |
| 0.5 g of 50% solution of Mg(SCN)$_2$ | 1559 |
| 0.75 g of 33% solution of MgBr$_2$ | 1045 |
| 0.75 g of 33% solution of MgCl$_2$ | 406 |
| 0.5 g of 50% solution of (CH$_3$COO)$_2$Mg | 406 |
| 0.5 g of 50% solution of Ba(ClO$_4$)$_2$ | 625 |
| 0.5 g of 50% solution of Al(ClO$_4$)$_3$ | 435 |
| 0.5 g of 50% solution of Cu(ClO$_4$)$_2$ | 473 |
| 0.5 g of 50% solution of VO(ClO$_4$)$_2$ | 428 |
| 0.5 g of 50% solution of Mg(ClO$_4$)$_2$ | 8 |

EXAMPLE 6

The procedure of Example 5 was repeated, using, as the accelerator, a solution in 2-methoxyethanol of manganese, cobalt, nickel, zinc, and calcium perchlorates or, for purposes of comparison, of another zinc or calcium salt. The gelation times are shown in Table II.

TABLE II

| Accelerator | Gel time (minutes) |
|---|---|
| 0.5 g of 50% solution of Mn(ClO$_4$)$_2$ | 4½ |
| 0.5 g of 50% solution of Co(ClO$_4$)$_2$ | 4½ |
| 0.5 g of 50% solution of Ni(ClO$_4$)$_2$ | 7 |
| 1.0 g of 33% solution of ZnCl$_2$ | 682 |
| 0.5 g of 50% solution of Zn(ClO$_4$)$_2$ | 13 |
| 0.5 g of 50% solution of CaBr$_2$ | 1522 |
| 1 g of 25% solution of CaCl$_2$ | 545 |
| 0.5 g of 50% solution of Ca(ClO$_4$)$_2$ | 74 |

EXAMPLE 7

A mixture of Epoxide resin I (50 g), 12.5 g of Hardener I, and 17.5 g of high-boiling tar acids took 60 minutes to gel, but a similar mixture containing 0.5 g of a 50% solution of magnesium perchlorate in 2-methoxyethanol gelled in only 9.5 minutes.

EXAMPLE 8

50% solutions of magnesium perchlorate in various solvents were prepared, and 0.5 g of each solution was incorporated in a mixture comprising 50 g of Epoxide resin I and 16 g of Hardener III. The gel times of the resultant compositions are given in Table III.

TABLE III

| Solvent | Gel time (mins) |
|---|---|
| Ethyl methyl ketone | 12 |
| N-Methylpyrrolidone | 16 |
| Diethylene glycol | 18 |
| Ethylene glycol | 16 |
| γ-Butyrolactone | 14 |

(Compare Example 5, where the gel time of the mixture without magnesium perchlorate is shown to be 2682 minutes.)

EXAMPLE 9

A mixture of Epoxide resin II (50 g) and 19.5 g of Hardener III took 4580 minutes to gel: in the presence of 0.5 g of a 50% solution of magnesium perchlorate in 2-methoxyethanol, a similar mixture gelled in only 3 minutes.

EXAMPLE 10

Further mixtures were prepared as shown in Table IV, the figures indicating grams. The gelation times of the compositions are also shown in the Table.

TABLE IV

|  |  |  |  |  |  |  |  |  |
|---|---|---|---|---|---|---|---|---|
| Epoxide resin III | 50 | 50 | — | — | — | — | — | — |
| Epoxide resin IV | — | — | 17.5 | 17.5 | — | — | — | — |
| Epoxide resin V | — | — | 7.5 | 7.5 | — | — | — | — |
| Epoxide resin VI | — | — | — | — | 50 | 50 | — | — |
| Epoxide resin VII | — | — | — | — | — | — | 50 | 50 |
| Hardener I | 21 | 21 | — | — | — | — | — | — |
| Hardener III | — | — | 10.7 | 10.7 | 26.5 | 26.5 | 22.6 | 22.6 |
| γ-Butyrolactone | 17.5 | 17.5 | — | — | — | — | — | — |
| 50% solution of Mg(ClO$_4$)$_2$ in 2-methoxyethanol | — | 0.5 | — | 0.25 | — | 0.5 | — | 0.5 |
| Gel time (minutes) | 6159 | 73 | 3600 | 2½ | 3133 | 4½ | 8075 | 8½ |

What is claimed is:
1. A curable composition comprising
   a. an epoxide resin
   b. a curing amount of an aromatic or cycloaliphatic polyamine containing at least three hydrogen atoms per molecule attached to amino nitrogen atoms, at least two of which hydrogen atoms are attached to, respectively, aromatic or cycloaliphatic amino nitrogen, and
   c. a perchlorate selected from magnesium, calcium, zinc, manganese, cobalt, and nickel perchlorates.

2. The composition of claim 1, in which the polyamine contains no group or atom, other than aromatic or cycloaliphatic amino hydrogen atoms, capable of reaction with the epoxide resin under the curing conditions employed.

3. The composition of claim 1, containing from 0.2 to 2 parts by weight of the perchlorate (c) per 100 parts of the combined weights of the epoxide resin and the polyamine.

4. The composition of claim 1, in which the epoxide resin is a polyglycidyl ester, a poly(β-methylglycidyl) ester, a polyglycidyl ether, a poly(β-methylglycidyl) ether, or an N,N'-diglycidyl derivative of a hydantoin.

5. The composition of claim 1, in which the polyamine is bis(4-aminophenyl)methane, bis(4-aminophenyl) sulphone, bis(4-aminophenyl) ketone, bis(4-aminophenyl) ether, o-, m-, or p-phenylenediamine, or bis(4-amino-3-ethylphenyl)methane.

6. The composition of claim 1, in which the polyamine is bis(4-aminocyclohexyl)methane, bis(4-amino-3-methylcyclohexyl)methane, 2,2-bis(4-aminocyclohexyl)propane, or 3-aminomethyl-3,5,5-trimethylcyclohexylamine.

7. The composition of claim 1, in which the perchlorate (c) is dissolved in an inert organic solvent.

8. The composition of claim 7, in which the solvent is 2-methoxyethanol, ethylene glycol, diethylene glycol, N-methylpyrrolidone, γ-butyrolactone, or ethyl methyl ketone.

9. A two part pack, the components of which, on mixing, form a curable composition according to claim 1, one part containing the epoxide resin and the other part containing the polyamine, the perchlorate (c) being contained in one or both parts.

10. The cured product obtained by curing a composition according to claim 1.

* * * * *